(12) United States Patent
Tanigawa et al.

(10) Patent No.: US 9,102,499 B2
(45) Date of Patent: Aug. 11, 2015

(54) FILAMENT WINDING DEVICE

(75) Inventors: Motohiro Tanigawa, Kyoto (JP); Ken Hatta, Toyota (JP)

(73) Assignees: MURATA MACHINERY, LTD., Kyoto (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 37 days.

(21) Appl. No.: 13/985,972

(22) PCT Filed: Sep. 22, 2011

(86) PCT No.: PCT/JP2011/071627
§ 371 (c)(1),
(2), (4) Date: Aug. 16, 2013

(87) PCT Pub. No.: WO2012/114570
PCT Pub. Date: Aug. 30, 2012

(65) Prior Publication Data
US 2013/0320129 A1 Dec. 5, 2013

(30) Foreign Application Priority Data

Feb. 21, 2011 (JP) ................. 2011-034878

(51) Int. Cl.
*B65H 54/64* (2006.01)
*B65H 54/00* (2006.01)
*B29C 53/60* (2006.01)
*B29C 53/80* (2006.01)
(Continued)

(52) U.S. Cl.
CPC .............. *B65H 54/00* (2013.01); *B29C 53/602* (2013.01); *B29C 53/8041* (2013.01); *B29C 70/382* (2013.01); *B29C 63/24* (2013.01); *B29C 70/32* (2013.01)

(58) Field of Classification Search
USPC ................ 242/437, 438, 438.1, 439.5, 439.6, 242/441.1, 444, 444.2
See application file for complete search history.

(56) References Cited

U.S. PATENT DOCUMENTS

2005/0076995 A1* 4/2005 Yasui ............................ 156/148
2005/0077643 A1* 4/2005 Matsuoka ..................... 264/103
(Continued)

FOREIGN PATENT DOCUMENTS

CN 1403360 A 3/2003
JP 2003-341932 A 12/2003
(Continued)

OTHER PUBLICATIONS

Japanese language international search report dated Nov. 8, 2011 and its English language translation issued in corresponding PCT application PCT/JP2011/071627.
(Continued)

*Primary Examiner* — Emmanuel M Marcelo
(74) *Attorney, Agent, or Firm* — DLA Piper LLP (US)

(57) ABSTRACT

A filament winding apparatus for winding a fiber bundle on the surface of a liner is configured so that the end position of a fiber layer of the dome section of the liner is easily corrected. A control section stores a series of operations for winding the fiber bundle on the liner as winding data including steps, controls a fundamental operation which winds the fiber bundle on the basis of the winding data, and also controls a correction operation which corrects the end position of the fiber layer on the basis of an actual value and a design value when forming a fiber layer by winding the fiber bundle on the dome section of the liner.

5 Claims, 5 Drawing Sheets

(51) Int. Cl.
*B29C 70/38* (2006.01)
*B29C 63/24* (2006.01)
*B29C 70/32* (2006.01)

(56) References Cited

U.S. PATENT DOCUMENTS

| | | |
|---|---|---|
| 2006/0096993 A1 | 5/2006 | Takashima |
| 2009/0038759 A1* | 2/2009 | Uozumi et al. ............... 156/425 |
| 2009/0127373 A1 | 5/2009 | Uozumi et al. |
| 2009/0314872 A1* | 12/2009 | Uozumi et al. ............... 242/410 |
| 2010/0025412 A1* | 2/2010 | Wakao ........................ 220/590 |
| 2010/0181213 A1* | 7/2010 | Fujita et al. .................. 206/7 |
| 2012/0037745 A1* | 2/2012 | Aiyama ....................... 242/430 |
| 2012/0048862 A1* | 3/2012 | Otsuka et al. ............. 220/495.01 |

FOREIGN PATENT DOCUMENTS

| | | |
|---|---|---|
| JP | 2006132746 A | 5/2005 |
| JP | 2005255359 A | 9/2005 |
| JP | 2006132746 A | 5/2006 |
| JP | 2007-190697 A | 8/2007 |
| JP | 2009119732 A | 6/2009 |
| JP | 2010000693 A | 1/2010 |
| JP | 2010253789 A | 11/2010 |

OTHER PUBLICATIONS

Japanese language international preliminary report on patentability dated Aug. 29, 2013 and its English language translation issued in corresponding PCT application PCT/JP2011/071627.

* cited by examiner $\theta = \arcsin(R1/R) - \arcsin(R2/R)$ $\theta 1 = |\theta| \times 2$

FILAMENT WINDING DEVICE

CROSS REFERENCE TO RELATED APPLICATIONS

This application is a national stage of international application PCT/JP2011/071627, filed on Sep. 22, 2011, and claims the benefit of priority under 35 USC 119 of Japanese application 2011-034878, filed on Feb. 21, 2011, which are incorporated herein by reference.

TECHNICAL FIELD

The present invention relates to the art of a filament winding apparatus.

BACKGROUND ART

Conventionally, a filament winding device for forming a plurality of fiber layers by winding fiber bundles impregnated with resin around an outside peripheral surface of a liner has been publicly known (for example, see Patent Literature 1). The filament winding device includes a control section for controlling the operation of winding fiber bundles to the liner. The control section stores, as winding data including plural steps, a series of operations for winding fiber bundles on the liner, and the control section controls an operation which winds fiber bundles on the basis of the winding data. Specifically, the control section includes a motion controller. The motion controller generates a control signal in every step on the basis of the winding data so as to realize the series of operations for winding fiber bundles.

By the way, in the design of the fiber layer formed onto the liner, the end positions of the fiber layer in dome sections at both ends of the liner are at predetermined positions in every fiber layer. An end position of the fiber layer is the position of the fiber layer at a minimum-diameter side (lowermost point of each fiber layer in the dome section) when winding fiber bundles around the dome section of the liner from a maximum-diameter side to the minimum-diameter side. That is, the end position of the fiber layer in the dome section of the liner is predetermined in a design for every fiber layer such that the intensity, size, etc. of the finished product satisfy predetermined conditions. Accordingly, the winding data stored in the control section is generated so as to achieve a target that the end position of each fiber layer becomes a design value.

PRIOR ART DOCUMENTS

Patent Literature

Patent Literature 1: the Japanese Patent Laid Open Gazette 2009-119732

SUMMARY OF THE INVENTION

Problems to be Solved by the Invention

However, when actually forming the fiber layer by winding fiber bundles onto the liner by means of the filament winding apparatus, the end position of the fiber layer in the dome section of the liner may occasionally be not based on the design value. This is often caused by the difference of types of the fiber bundles and viscosity of the resin impregnated to the fiber bundles. In such cases, it is possible to compare an actual value with the design value and correct the winding data to regenerate the winding data so as to become the end position of the fiber layer in the dome section to expected design value. However, regeneration of the winding data requires much labor and time.

The present invention is made in order to solve the above-described problems. An object of the present invention is to provide a filament winding apparatus which can correct the end position of the fiber layer in the dome section of the liner easily.

Means for Solving the Problems

The problems to be solved by the present invention have been described above. Now, means for solving the problems will be described.

That is to say, a first invention is a filament winding apparatus for winding a fiber bundle on the surface of a liner including a control section which stores a series of operations for winding the fiber bundle on the liner as winding data comprising plural steps and, controls a fundamental operation which winds the fiber bundle on the basis of the winding data and also controls a correction operation which corrects the end position of the fiber layer on the basis of an actual value and a design value when forming a fiber layer by winding the fiber bundle on a dome section of the liner.

A second invention is the filament winding apparatus of the first invention wherein the control section is programmed to interrupt the fundamental operation and to cut in the correction operation, among plural steps of winding data, at the end of the step of winding the fiber bundle to the end position of the fiber layer.

A third invention is the filament winding apparatus of the first or the second invention wherein a detection part for detecting the end position of the fiber layer is further included. The correction operation includes: operation for detecting the end position of the fiber layer which is formed in the fundamental operation by means of the detection part; operation for calculating the correction value on the basis of the actual value of the end position of the fiber layer and the design value of the end position of the fiber layer; and operation for adjusting (increase/decrease) the amount of winding of the fiber bundle on the basis of the correction value.

A fourth invention is the filament winding apparatus of the third invention wherein the control section is programmed to execute, among the correction operation, the operation for adjusting (increase/decrease) the amount of winding of the fiber bundle on the basis of the correction value and the operation for detecting the end position of the fiber layer by means of the detection part alternately, and to store increase/decrease amount of winding of the fiber bundle which is adjusted in the correction operation as a true correction value when a difference between the actual value of the end position of the fiber layer and the design value of the end position of the fiber layer is equal to or less than a predetermined value.

A fifth invention is the filament winding apparatus of the fourth invention, wherein the control section is programmed to interrupt the fundamental operation and to cut in the correction operation on the basis of the true correction value, among plural steps of winding data, at the end of the step of winding the fiber bundle to the end position of the fiber layer.

Effects of the Invention

The present invention exerts effects described below.

According to the first invention, the control section performs the fundamental operation which winds the fiber bundle on the basis of the winding data and also performs the correction operation which corrects the end position of the fiber layer on the basis of the actual value and the design value when forming a fiber layer by winding the fiber bundle around the dome section of the liner. Accordingly, the end position of the fiber layer at the dome section of the liner can be easily corrected.

According to the second invention, the control section interrupts the fundamental operation and cuts in the correction operation, among plural steps of winding data, at the end of the step of winding the fiber bundle to the end position of the fiber layer. Accordingly, the end position of the fiber layer at the dome section of the liner can be easily corrected without correcting the winding data.

According to the third invention, the control section performs the operation for detecting the end position of the fiber layer which is formed in the fundamental operation by means of the detection part, the operation for calculating the correction value on the basis of the actual value of the end position of the fiber layer and the design value of the end position of the fiber layer, and the operation for adjusting (increase/decrease) the amount of winding of the fiber bundle on the basis of the correction value. Accordingly, the end position of the fiber layer at the dome section of the liner can be automatically and easily corrected.

According to the fourth invention, the increase/decrease amount of winding of the fiber bundle which is adjusted in the correction operation is stored in the control section as the true correction value. Accordingly, accurate correction values for correcting the end position of the fiber layer at the dome section of the liner can be stored and utilized.

According to the fifth invention, the control section interrupts the fundamental operation and cuts in the correction operation on the basis of the true correction value, among plural steps of winding data, at the end of the step of winding the fiber bundle to the end position of the fiber layer. Accordingly, the correction operation can be performed swiftly on the basis of the accurate correction values for correcting the end position of the fiber layer at the dome section of the liner. Therefore, production efficiency is improved.

DESCRIPTION OF EMBODIMENTS

An explanation will be given of a filament winding apparatus 100 (Hereinafter referred to as "FW apparatus 100") which is one embodiment of the present invention.

Figure 1:
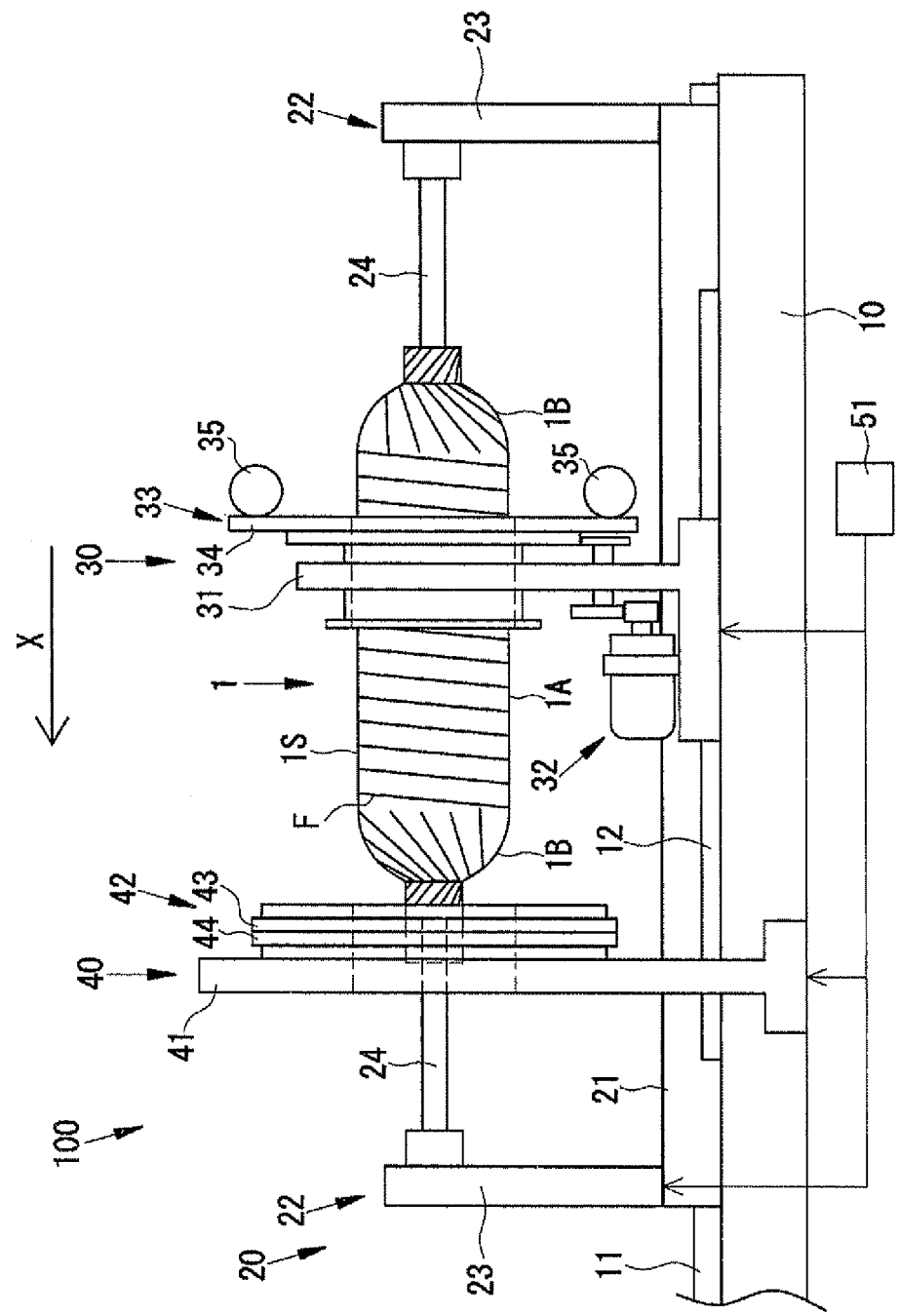
FIG. 1 is a side view of a filament winding apparatus showing an overall configuration.

FIG. 1 illustrates an overall configuration of the FW apparatus 100. An arrow X in the drawing shows a transfer direction of a liner 1. The direction in parallel to the transfer direction of the liner 1 is regarded as the longitudinal direction of the FW apparatus 100, and the transfer direction of the liner 1 and the direction opposite thereto are respectively defined as the front side (the left side in the drawing) and the rear side (the right side in the drawing). The FW apparatus 100 reciprocates the liner 1 in the longitudinal direction, whereby the front side and the rear side is determined depending on the transfer direction of the liner 1.

The FW apparatus 100 is configured to form a plurality of fiber layers by winding a fiber bundle F around an outside peripheral surface 1S of the liner 1. The FW apparatus 100 mainly includes a main pedestal 10, a liner transfer device 20, a hoop winding device 30, a helical winding device 40, and a control section 51.

The liner 1 is, for example, a substantially cylindrical hollow container formed of high strength aluminum, polyamide resin or the like. A center portion of the liner 1 is a cylindrical section 1A of a constant diameter, and dome sections 1B are formed on both ends of the cylindrical section 1A. The dome section 1B is formed into a dome shape in which the diameter becomes smaller toward the end part side. The pressure resistance of the liner 1 is improved by winding the fiber bundle around the outside peripheral surface 1S. Namely, the liner 1 is a base member constituting a pressure resistance hollow container.

The main pedestal 10 is a main structure which constitutes the basis of the FW apparatus 100. An upper portion of the main pedestal 10 is provided with a rail for the liner transfer device 11. The liner transfer device 20 is mounted on the rail for the liner transfer device 11. The upper portion of the main pedestal 10 is provided with a rail for the hoop winding device 12 which runs in parallel to the rail for the liner transfer device 11. The hoop winding device 30 is mounted on the rail for the hoop winding device 12.

Because of this configuration, the main pedestal 10 constitutes the basis of the FW apparatus 100, and the liner transfer device 20 and the hoop winding device 30 can move along the longitudinal direction of the FW apparatus 100.

The liner transfer device 20 is configured to transfer the liner 1 while rotating it. The liner 1 is rotated about the longitudinal direction of the FW apparatus 100 as a center axis, and is transferred along the longitudinal direction of the FW apparatus 100 by liner transfer device 20. The liner transfer device 20 mainly includes a pedestal 21 and liner support parts 22.

An upper portion of the pedestal 21 is provided with the pair of liner support parts 22. The liner support part 22 includes a liner support frame 23 and a rotational shaft 24. The liner support frame 23 is extended upward from the pedestal 21. The rotational shaft 24 is extended longitudinally from the liner support frame 23. The liner 1 is attached to the rotational shaft 24 and is rotated along one direction via a power mechanism (not shown in Figures).

Because of this configuration, it is possible that the liner 1 is rotated about the longitudinal direction of the FW apparatus 100 as a center axis, and is transferred along the longitudinal direction of the FW apparatus 100 by liner transfer device 20.

The hoop winding device 30 is configured to form the fiber layer by winding the fiber bundle F around the outside peripheral surface 1S of the liner 1. The hoop winding device 30 performs so-called hoop winding. In the hoop winding, the winding angle of the fiber bundle F is substantially perpendicular to the longitudinal direction of the FW apparatus 100. The hoop winding device 30 mainly includes a pedestal 31, a power mechanism 32 and a hoop mounting device 33.

The pedestal 31 is provided with the hoop mounting device 33 which is rotated via the power mechanism 32. The hoop mounting device 33 includes a mounting table 34 and a bobbin 35, and performs hoop winding on outside peripheral surface 1S of the liner 1. The mounting table 34 mainly performs hoop winding. The bobbin 35 supplies the fiber bundle F to the mounting table 34. The fiber bundle F is guided to the outside peripheral face 1S of the liner 1 with a fiber bundle guide provided to the mounting table 34, and hoop winding is performed by rotating the mounting table 34.

Because of this configuration, the hoop winding device 30 performs hoop winding, in which the winding angle of the fiber bundle F in the cylindrical section 1A of the liner 1 is substantially perpendicular to the longitudinal direction of the FW apparatus 100, mainly to the cylindrical section 1A of the liner 1.

The helical winding device 40 is configured to form the fiber layer by winding the fiber bundle F around the outside peripheral surface 1S of the liner 1. The helical winding device 40 performs so-called helical winding in which the winding angle of the fiber bundle F is set to be a prescribed value relative to the longitudinal direction of the FW apparatus 100. The helical winding device 40 mainly includes a pedestal 41 and a helical mounting device 42.

Figure 2:
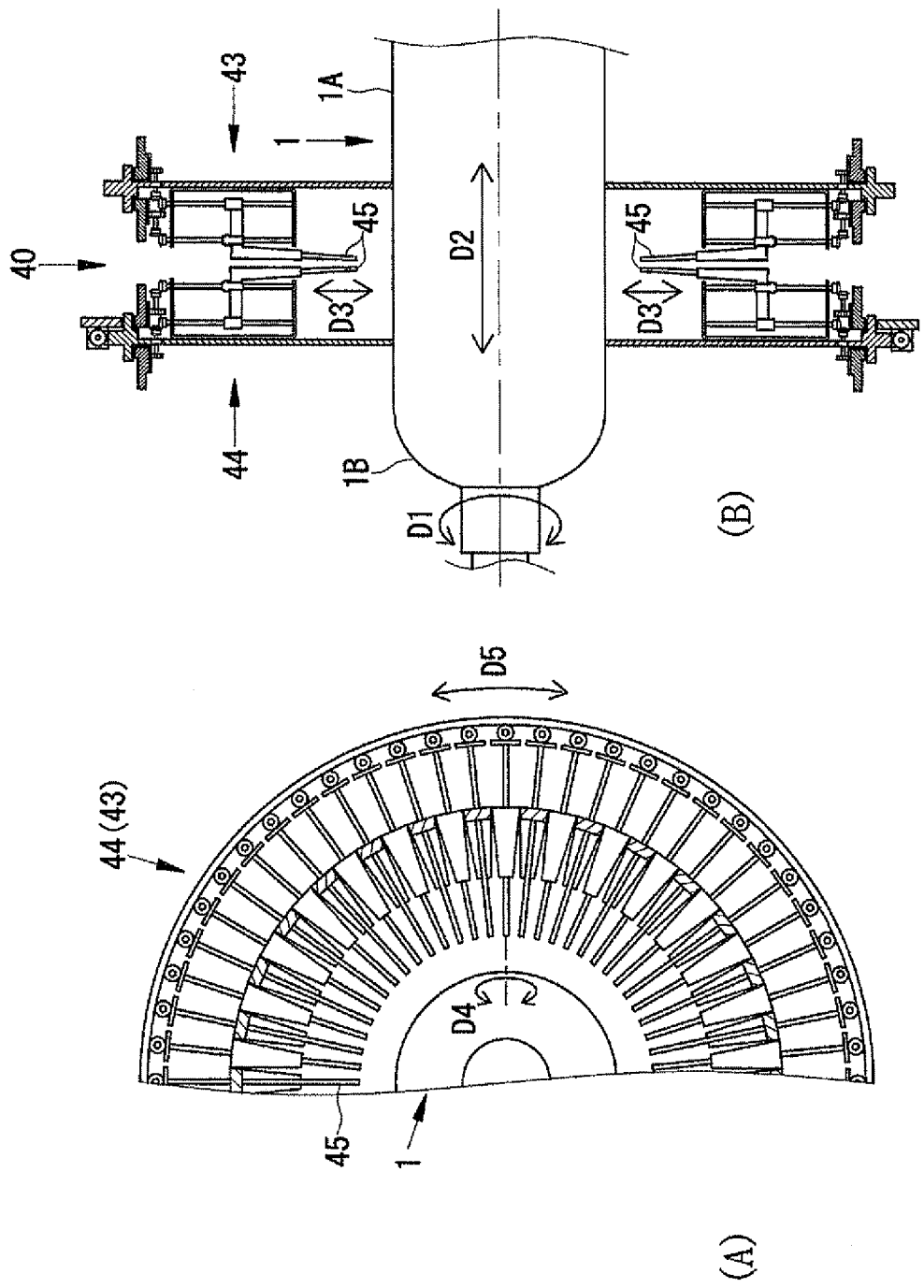
FIG. 2A is a front view of a helical winding device.
FIG. 2B is a side sectional view of the helical winding device.

The pedestal 41 is provided with the helical mounting device 42. The helical mounting device 42 includes a first helical head 43 and a second helical head 44, and performs helical winding on the outside peripheral surface 1S of the liner 1. Fiber bundle guides 45 (See FIG. 2) provided to the first helical head 43 and fiber bundle guides 45 (See FIG. 2) provided to the second helical head 44 respectively guide the fiber bundles F to the outside peripheral surface 1S of the liner 1, then the helical winding is performed with the liner passing through while rotating.

Because of this configuration, the helical winding device 40 performs the helical winding, where the winding angle of the fiber bundle F in the cylindrical section 1A and the dome sections 1B of the liner 1 are set to be the prescribed value relative to the longitudinal direction of the FW apparatus 100, to the cylindrical section 1A and the dome sections 1B of the liner 1.

The control section 51 is configured to control the liner transfer device 20, the hoop winding device 30, the helical winding device 40 and the like so as to control a series of operations for winding the fiber bundle F around the outside peripheral face 1S of the liner 1. The control section 51 includes a CPU as an operation unit, a ROM as a memory unit, a RAM, a motion controller 52 and the like. The ROM of the control section 51 stores control software for causing hardware such as the CPU arranged in the control section 51 to operate as a control section of the FW apparatus 100.

The control software sets up the series of operations for winding the fiber bundle F on the liner 1 as winding data consisting of a plurality of steps. The memory unit stores the winding data. The motion controller 52 generates a control signal based on the set-up winding data. The winding data is an operation diagram (See FIG. 4) which represents the operations of motors 54A, 54B . . . to be controlled with numerical value for every step.

The series of operations for winding the fiber bundle F is such operations that, for instance, the liner transfer device 20 which transfers the liner 1 while rotating it, and the helical winding device 40 which rotates the second helical head 44 so as to change phases of the fiber bundle guides 45 wind the fiber bundle F onto the liner 1 in conjunction with each other.

Here, a fundamental operation is defined as an operation for winding the fiber bundle F on the liner 1 by generating the control signal for every step based on the previously set winding data. Moreover, when forming the fiber layer by winding the fiber bundle F around the dome section 1B of the liner 1, a correction operation is defined as an operation for detecting an end position of the fiber layer and correcting the end position of the fiber layer on the basis of an actual value and a design value. When forming the fiber layer by winding the fiber bundle F around the dome section 1B of the liner 1, the control section 51 controls not only the fundamental operation based on the winding data, but also the correction operation for correcting the end position of the fiber layer on the basis of the actual value and the design value.

Figure 3:
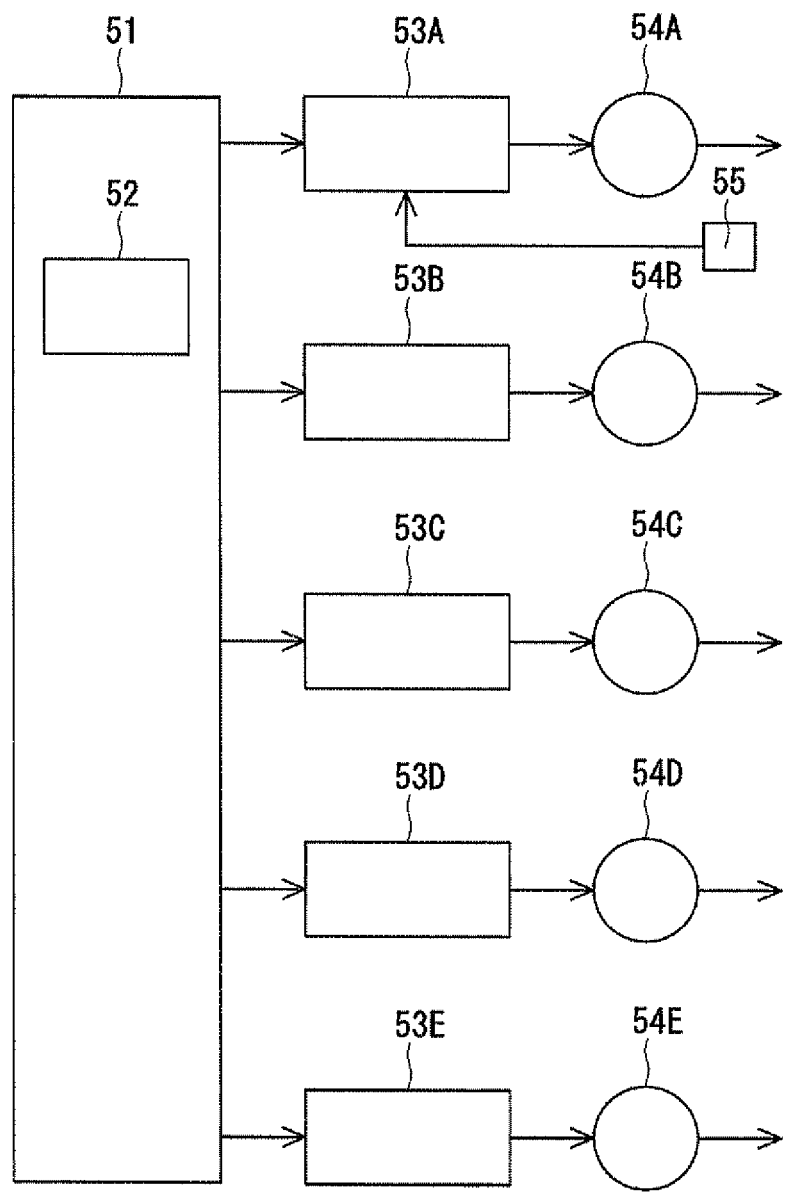
FIG. 3 shows a control system of the filament winding apparatus.

A detailed explanation will be given of a control system of the FW apparatus 100. FIG. 3 is a figure which shows the control system including the control section 51. The control section 51 constitutes the core of the control system in the FW apparatus 100. The control system of the FW apparatus 100 mainly includes the control section 51, motor drivers 53A, 53B . . . , the motors 54A, 54B . . . , and a detection part 55.

The control section 51 generates a control signal based on the winding data. In particular, the motion controller 52 of the control section 51 generates a pulse signal whose number of pulses and frequency are corresponding to each numerical value of the winding data, and outputs the pulse signal to the motors 54A, 54B . . . through the motor drivers 53A, 53B . . . .

The motors 54A, 54B . . . are pulse-input-type stepping motors or servomotors. The motors 54A, 54B . . . convert the pulse input from the motor drivers 53A, 53B . . . into rotational power.

Figure 5:
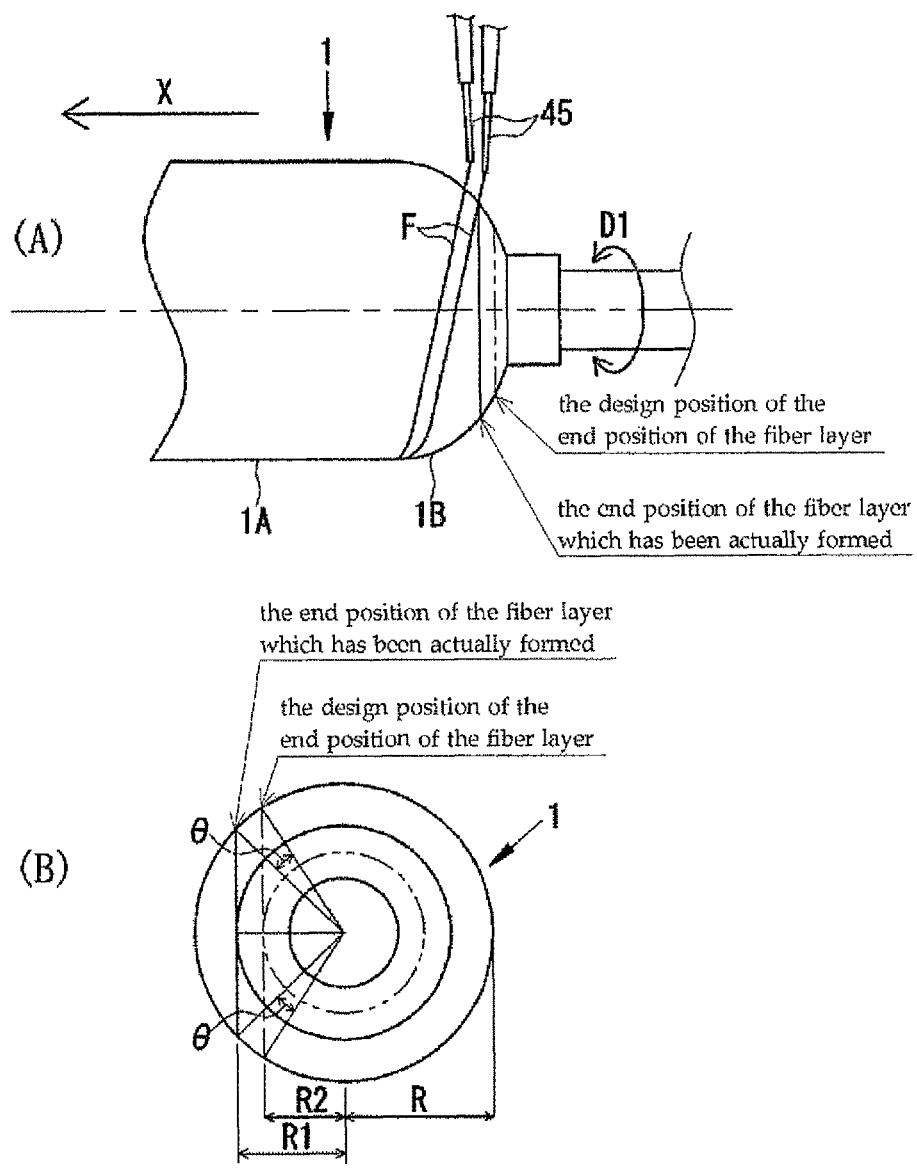
FIG. 5A is a side view showing a state during winding of the fiber bundle onto a dome section 1B of a liner 1.
FIG. 5B is a front view of the dome section 1B of the liner 1.

The detection part 55 detects the end position of the fiber layer formed in the fundamental operation or the correction operation, generates a voltage signal corresponding to the end position of the fiber layer, and outputs the voltage signal to the control section 51 (See FIG. 5). For instance, a camera is used as the detection part 55, and the end position of the fiber layer may be detected by processing the captured image.

Because of this configuration, in the present control system, the control section 51 generates the control signal and drives the motors 54A, 54B through the motor drivers 53A, 53B . . . .

Figure 4:
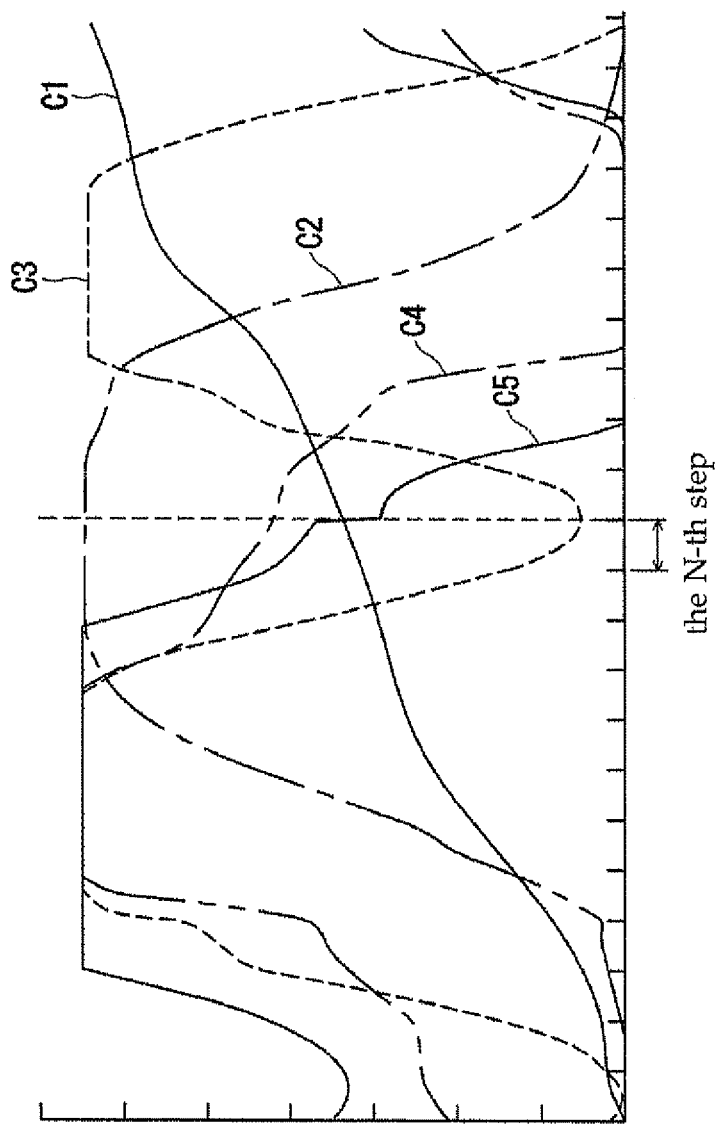
FIG. 4 shows an example of a winding data which indicates sequential operations of winding a fiber bundle.

Next, a detailed explanation will be given of the winding data. FIG. 4 shows an example of the winding data which illustrates the series of operations for winding the fiber bundle F. The horizontal axis of this figure shows the steps of the series of operations for winding the fiber bundle F. The vertical axis of this figure shows the operations of the motors 54A, 54B . . . to be controlled with numerical value. Moreover, the N-th step shown in FIG. 4 is supposed the step in which the fiber bundle is wound to the end position of a certain fiber layer among plural steps of the winding data.

A winding data C1 illustrates the rotation operation of the liner 1. The control section 51 generates a control signal based on the winding data C1 and drives the motor 54A of the power mechanism constituting the liner transfer device 20. Since the rotation direction of the liner 1 is kept constant (See arrow D1 in FIG. 2B), the winding data C1 illustrates a divergent operation in which numerical value increases in every step.

A winding data C2 illustrates the transfer operation of the liner 1. The control section 51 generates a control signal based on the winding data C2 and drives the motor 54B of the power mechanism constituting the liner transfer device 20. Since the transfer direction of the liner 1 is changed in the longitudinal direction (See arrow D2 in FIG. 2B), the winding data C2 illustrates a repetitive operation in which numerical value decreases after increasing.

A winding data C3 illustrates the extension/contraction operation of the fiber bundle guide 45. The control section 51 generates a control signal based on the winding data C3 and drives the motor 54C of the power mechanism constituting the helical winding device 40. Since the extension/contraction direction of the fiber bundle guide 45 is changed in the approaching or separating direction with respect to the outside peripheral face 1S of the liner 1 (See arrow D3 in FIG. 2B), the winding data C3 illustrates a repetitive operation in which numerical value decreases after increasing.

A winding data C4 illustrates the rotation operation of the fiber bundle guide 45. The control section 51 generates a control signal based on the winding data C4 and drives the motor 54D of a power mechanism constituting the helical winding device 40. Since the rotation direction of the fiber bundle guide 45 is changed in positive rotation or negative rotation (See arrow D4 in FIG. 2A), the winding data C4 illustrates a repetitive operation in which numerical value decreases after increasing.

A winding data C5 illustrates the rotation operation of the second helical head 44. The control section 51 generates a control signal based on the winding data C5 and drives the motor 54E of the power mechanism constituting the helical winding device 40. Since the rotation direction of the second helical head 44 is changed in positive rotation or negative rotation (See arrow D5 in FIG. 2A), the winding data C5 illustrates a repetitive operation in which numerical value decreases after increasing.

Next, an explanation will be given of a control in the correction operation when forming the fiber layer by winding the fiber bundle F around the dome section 1B of the liner 1. As previously explained, the N-th step shown in FIG. 4 is supposed the step in which the fiber bundle is wound to the end position of a certain fiber layer among plural steps of the winding data. FIGS. 5A and 5B show the state in which the N-th step of the fundamental operation of the winding data is ended and the winding of the fiber bundle has reached the end position of the fiber layer on the dome section. The end position of the fiber layer which has been actually formed is shown in a solid line. Meanwhile, it is supposed that a designed position of the end position of this fiber layer is set the position shown in a two-dot chain line. The winding data is prepared aiming that, at the end of the N-th step of the fundamental operation, the end position of the fiber layer matches a design value. But in reality, the end position of the fiber layer has not reached the design value at the end of the N-th step of the fundamental operation. In this manner, when there is a difference between an actual value and the design value of the end positions of the fiber layer, the control section 51 interrupts the fundamental operation at the end of the N-th step of the winding data and cut in a correction operation.

FIG. 5 shows the cases in which the end position of the fiber layer has not reached the design value at the end of the Nth step of the fundamental operation. That is, the actual amount of winding is lacking with respect to the design value. In this case, the control section 51 performs control for adding the amount of winding in the correction operation which is described further below. On the other hand, there are times when the end position of the fiber layer exceeds the design value at the end of the N-th step of the fundamental operation. That is, the cases in which the actual amount of winding is excessive with respect to the design value. In this case, the control section 51 performs control for decreasing the amount of winding in the correction operation which is described further below.

In the correction operation, first of all, the end position of the fiber layer formed in the fundamental operation is detected by the detection part 55. In the present embodiment, as shown in FIG. 5(B), the fiber layer is imaged from the axial direction of the liner 1 by means of the detection part 55, and the image captured is processed so as to detect the actual value of the end position of the fiber layer.

Next, the control section 51 calculates a correction value on the basis of the actual value and the design value of the end positions of the fiber layer. In the present embodiment, the correction value includes a rotation direction and a rotation angle of the liner 1. It is supposed that the control section 51 does not control the transfer operation of the liner 1, the extension/contraction operation of the fiber, bundle guides 45, the rotation operation of the fiber bundle guides 45, and the rotation operation of the second helical head 44 during the correction operation of the present embodiment. These are kept in a state at the end of the N-th step of the fundamental operation. The correction operation is performed under these circumstances.

As shown in FIG. 5B, the rotation direction of the correction value is determined as follows. When the actual value of the end position of the fiber layer is lacking with respect to the design value, that is, when R1−R2>0 (plus) (R1: an actual value of the radius of the fiber layer in the end position, R2: a design value of the radius of the fiber layer in the end position), the rotation direction is set to a direction where the amount of winding is added (Normal rotation: the direction of D1 in FIG. 5A). On the other hand, when the actual value of the end position of the fiber layer is excessive with respect to the design value, that is, when R1−R2<0 (minus), the rotation direction is set to a direction where the amount of winding is decreased (Reverse rotation: the direction contrary to D1 in FIG. 5A).

As shown in FIG. 5B, the rotation angle of the correction value $\theta 1$ is calculated using the following formula 1, wherein the radius of the liner 1 is R, the actual value of the radius of the fiber layer in the end position is R1, and the design value of the radius of the fiber layer in the end position is R2.

$$\theta 1 = |\arcsin(R1/R) - \arcsin(R2/R)| \times 2 \quad [\text{Formula 1}]$$

Next, the control section 51 controls the driving of the motor 54A so as to execute, among the correction operation, the operation for adjusting (increase/decrease) the amount of winding of the fiber bundle on the basis of the correction value and the operation for detecting the end position of the fiber layer by means of the detection part alternately. In the present embodiment, the liner rotation angle is set to the calculated correction value $\theta 1$ (100%), and the rotation direction is set to the normal direction in the first winding operation. When the first winding operation is terminated, the end position of the fiber layer is detected by means of the detection part so as to compare "the actual value R1 of the radius of the fiber layer in the end position" with "the design value R2 of the radius of the fiber layer in the end position". When R1>R2 is satisfied, the control section 51 repeatedly executes the operation for rotating the liner 1 in the normal direction at the correction value $\theta 1$ (100%) and the operation for detecting the end position of the fiber layer by means of the detection part alternately until R1<R2 is satisfied.

When R1<R2 is satisfied, the liner rotation angle is set to 25% of the correction value $\theta 1$, and the rotation direction is set to the reverse direction. The control section 51 repeatedly executes the operation for rotating the liner 1 in the reverse direction at 25% of the correction value $\theta 1$ and the operation for detecting the end position of the fiber layer by means of the detection part alternately until R1>R2 is satisfied.

Then, when R1>R2 is satisfied, the liner rotation angle is set to 6% of the correction value $\theta 1$, and the rotation direction is set to the normal direction. The control section 51 repeatedly executes the operation for rotating the liner 1 in the normal direction at 6% of the correction value $\theta 1$ and the operation for detecting the end position of the fiber layer by means of the detection part alternately until R1<R2 is satisfied.

Then, when R1<R2 is satisfied, the liner rotation angle is set to 1.5% of the correction value $\theta 1$, and the rotation direction is set to the reverse direction. The control section 51 repeatedly executes the operation for rotating the liner 1 in the reverse direction at 1.5% of the correction value θ1 and the operation for detecting the end position of the fiber layer by means of the detection part alternately until R1>R2 is satisfied.

Then, when R1>R2 is satisfied, the correction operation is terminated at the point of time. In other words, the correction operation is terminated at the time when a difference between the actual value and the design value of the end positions of the fiber layer reached 1.5% or below of the correction value θ1 for the rotation angle of the liner 1. After the correction operation is terminated, the control section 51 restarts the fundamental operation from the N+1-th step of the winding data.

The increase/decrease amount of winding of the fiber bundle which is adjusted in the correction operation may be stored in the control section 51 as a true correction value at the time when the correction operation is terminated. In the correction operation according to the present embodiment, for instance, when "the correction value θ1 (100%), normal rotation", "25% of the correction value θ1, reverse rotation", "6% of the correction value θ1, normal rotation", and "1.5% of the correction value θ1, reverse rotation" have been performed once each, the liner rotation angle of the true correction value θ2 is "79.5% of the correction value θ1", and the rotation direction of the true correction value θ2 is "normal rotation".

Also, after storing the true correction value as above, the control section 51 may interrupt the fundamental operation and cut in the correction operation on the basis of the true correction value at the end of the N-th step of the winding data when winding the fiber bundle onto the next liner 1 so as to wind a fiber layer.

According to the above-described FW apparatus 100 of the present embodiment, the following effects can be achieved.

The control section 51 performs the fundamental operation which winds the fiber bundle F on the basis of the winding data and also performs the correction operation which corrects the end position of the fiber layer on the basis of the actual value and the design value when forming a fiber layer by winding the fiber bundle F around the dome section 1B of the liner 1. Accordingly, the end position of the fiber layer at the dome section 1B of the liner 1 can be easily corrected.

The control section 51 interrupts the fundamental operation and cuts in the correction operation, among plural steps of winding data, at the end of the step of winding the fiber bundle F to the end position of the fiber layer. Accordingly, the end position of the fiber layer at the dome section 1B of the liner 1 can be easily corrected without correcting the winding data.

The control section 51 performs the operation for detecting the end position of the fiber layer which is formed in the fundamental operation by means of the detection part 55, the operation for calculating the correction value on the basis of the actual value of the end position of the fiber layer and the design value of the end position of the fiber layer, and the operation for adjusting (increase/decrease) the amount of winding of the fiber bundle F on the basis of the correction value. Accordingly, the end position of the fiber layer at the dome section 1B of the liner 1 can be automatically and easily corrected.

The increase/decrease amount of winding of the fiber bundle F which is adjusted in the correction operation is stored as the true correction value. Accordingly, accurate correction values for correcting the end position of the fiber layer at the dome section 1B of the liner 1 can be stored and utilized.

The control section 51 interrupts the fundamental operation and cuts in the correction operation on the basis of the true correction value, among plural steps of winding data, at the end of the step of winding the fiber bundle F to the end position of the fiber layer. Accordingly, the correction operation can be performed swiftly on the basis of the accurate correction values for correcting the end position of the fiber layer at the dome section 1B of the liner 1. Therefore, production efficiency is improved.

The embodiment of the present invention has been explained as above. However, the present invention is not limited to the embodiment mentioned above and can be altered variously. In some cases, the correction operation is not necessarily performed after the step of winding the fiber bundle to the end position of a certain fiber layer. It will do to perform only the detection of the end position of the fiber layer, and the correction operation may be cut in only when there is a difference between the actual value and the design value of the end positions of the fiber layer.

In the above-mentioned correction operation, the end position of the fiber layer formed by the fundamental operation is detected by the detection part 55. However, an operator may measure the end position of the fiber layer manually, and the correction operation may be performed on the basis of the measured actual value.

INDUSTRIAL APPLICABILITY

The filament winding apparatus of the present invention is industrially useful because the end position of the fiber layer at the dome section of the liner can be easily corrected.

DESCRIPTION OF NOTATIONS 1 liner
10 main pedestal
20 liner transfer device
30 hoop winding device
40 helical winding device
43 fixed helical head
44 movable helical head
45 fiber bundle guide
51 control section
52 motion controller
53A motor driver
54A motor
55 detection part
F fiber bundle

What is claimed is:

1. A filament winding apparatus for winding a fiber bundle on the surface of a liner comprising:
   a control section which stores a series of operations for winding the fiber bundle on the liner as winding data comprising plural steps, controls a fundamental operation which winds the fiber bundle on the basis of the winding data, and also controls a correction operation which corrects the end position of the fiber layer on the basis of an actual value and a design value when forming a fiber layer by winding the fiber bundle on a dome section of the liner.

2. The filament winding apparatus according to claim 1, wherein the control section is programmed to interrupt the fundamental operation and to cut in the correction operation, among plural steps of winding data, at the end of the step of winding the fiber bundle to the end position of the fiber layer.

3. The filament winding apparatus according to claim 2,
   further comprising a detection part for detecting the end position of the fiber layer,
   wherein, the correction operation includes:
   operation for detecting the end position of the fiber layer which is formed in the fundamental operation by means of the detection part;

operation for calculating the correction value on the basis of the actual value of the end position of the fiber layer and the design value of the end position of the fiber layer; and, operation for adjusting (increase/decrease) the amount of winding of the fiber bundle on the basis of the correction value.

4. The filament winding apparatus according to claim 3, wherein the control section is programmed to execute, among the correction operation, the operation for adjusting (increase/decrease) the amount of winding of the fiber bundle on the basis of the correction value, and the operation for detecting the end position of the fiber layer by means of the detection part alternately, and to store increase/decrease amount of winding of the fiber bundle which is adjusted in the correction operation as a true correction value when a difference between the actual value of the end position of the fiber layer and the design value of the end position of the fiber layer is equal to or less than a predetermined value.

5. The filament winding apparatus according to claim 4, wherein the control section is programmed to interrupt the fundamental operation and to cut in the correction operation on the basis of the true correction value, among plural steps of winding data, at the end of the step of winding the fiber bundle to the end position of the fiber layer.

\* \* \* \* \*